(No Model.)
C. W. RAMSAY.
PROCESS OF TREATING FERMENTED, FERMENTABLE, AND DISTILLED LIQUIDS IN VACUO.
No. 347,441. Patented Aug. 17, 1886.
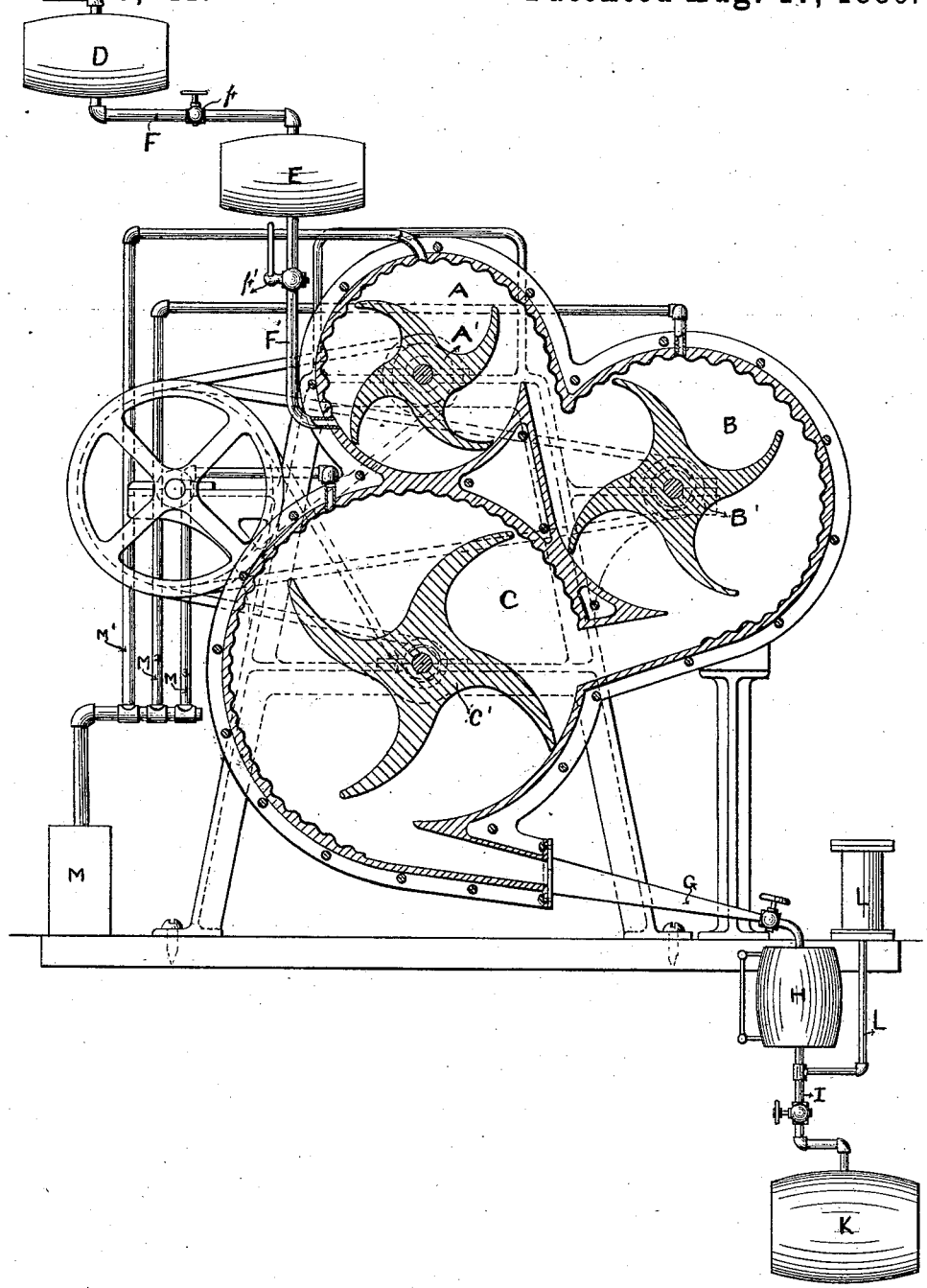
WITNESSES.
M. Randolph
Alexander Lowry
INVENTOR.
Charles W. Ramsay

UNITED STATES PATENT OFFICE.

CHARLES W. RAMSAY, OF BROOKLYN, ASSIGNOR TO THE RAMSAY PURIFYING COMPANY, OF NEW YORK, N. Y.

PROCESS OF TREATING FERMENTED, FERMENTABLE, AND DISTILLED LIQUIDS IN VACUO.

SPECIFICATION forming part of Letters Patent No. 347,441, dated August 17, 1886.

Application filed April 28, 1885. Renewed January 25, 1886. Serial No. 189,675. (No model.)

*To all whom it may concern:*

Be it known that I, CHARLES W. RAMSAY, of the city of Brooklyn, in the county of Kings and State of New York, have invented a new and useful Improvement in Process of Treating Fermented, Fermentable, and Distilled Liquids by Concussion in Vacuo; and I hereby declare the following to be a full and clear description thereof.

This invention relates to an improvement on a process heretofore patented by me for treating by concussion fermented and fermentable liquids for the purpose of arresting or preventing injurious fermentation and for treating distilled liquids for the purpose of aging them, the present improvement consisting of the application of a vacuum to the concussion-chambers in which the said liquids are treated.

The invention will be readily understood by reference to the accompanying drawing, which represents a sectional elevation of an apparatus which I use in carrying out my said improved process.

In the said apparatus are shown three treating-chambers, A B C, each of helical or nearly helical shape, as shown in transverse section, and in each of said chambers is placed a revolving driver or beater, respectively marked in the drawing A' B' C'. In addition to these parts of the apparatus there is required a feeding-tank, D, and a charging-tank, E, which are connected together by the conduit or pipe F, in which there is a stop-cock, $f$, and the charging-tank E is connected to the first of the treating-chambers, A, by the conduit or pipe F', in which there is a stop-cock, $f'$. From the last of the treating-chambers a discharge-pipe, G, leads into a primary receiver, H, and from this primary receiver the pipe I leads into the storage-receiver K, which may be an ordinary barrel or cask or a large tank.

In connection with either the pipe G or I a pipe, L, leads to an air-pump, L', by means of which the air is exhausted from the treating-chambers, the charging-tank, the primary receiver, storage-tank, and all their intermediary pipes and conduits. By this means as nearly perfect a vacuum as possible is formed in the entire apparatus from the stop-cock $f$, to and including the storage tank or package; and this vacuum is produced before the stop-cock $f$ is opened to admit liquid to the apparatus, and is maintained as nearly perfect as the admission of oxygen and the vaporization of the fluid will admit during the entire time the treatment is progressing. For such liquids as require oxidation during the concussion treatment oxygen gas contained in a tank or holder, M, is conducted through suitable supply-pipes, M' M² M³, to each of the treating-chambers A B C, respectively. As in my former inventions, the beaters A' B' C', revolving rapidly in their inclosing-chambers, drive into a very minute spray or attenuated vapor the liquid under treatment, and in this treatment all toroula, infusoria, or organic life is destroyed in fermented or fermentable liquids, and in distilled liquids the oil or other globules are so broken up as to permit a homogeneous assimilation of the entire mass in the form of a cold vapor. It is the aim and object of this my present invention to produce this result as nearly as possible *in vacuo*, and the introduction of oxygen gas into the mass of the vapor in the treating-chamber and connections in no wise interferes with this vacuum process, for the quantity of gas so introduced is regulated to the amount the liquid is capable of absorbing and assimilating.

Having described my invention, I claim—

The process which consists in exhausting the air from a series of one or more treating-chambers and their inlet and outlet pipes, then arresting the action of the exhaust apparatus and introducing into the treating-machine without admixture of air and at a normal atmospheric temperature the liquid to be treated, which liquid is then driven by the machine into a very fine atomic or vapory form, in which state it is subjected while in the machine to violent concussions.

CHARLES W. RAMSAY.

Witnesses:
 M. RANDOLPH,
 ALEXANDER LOWRY.